United States Patent
Koebele

(10) Patent No.: US 10,670,730 B2
(45) Date of Patent: Jun. 2, 2020

(54) MEASURING SYSTEM AND MEASURING METHOD FOR MODEL BASED GENERATION OF GLOBAL NAVIGATION SATELLITE SYSTEM SIGNALS

(71) Applicant: Rohde & Schwarz GmbH & Co. KG, Munich (DE)

(72) Inventor: Johannes Koebele, Offenburg (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 448 days.

(21) Appl. No.: 14/694,347

(22) Filed: Apr. 23, 2015

(65) Prior Publication Data

US 2015/0355338 A1    Dec. 10, 2015

Related U.S. Application Data

(60) Provisional application No. 61/983,796, filed on Apr. 24, 2014.

(51) Int. Cl.
*G01S 19/23*    (2010.01)
*G01S 19/03*    (2010.01)

(52) U.S. Cl.
CPC .............. *G01S 19/23* (2013.01); *G01S 19/03* (2013.01)

(58) Field of Classification Search
CPC ........ G01S 19/23; G01S 19/33; G01S 5/0018; G01S 19/11; G01S 19/21; G01S 19/235; G01S 19/36; G01S 19/44; G01C 15/00; H04B 1/7097
USPC .................................................... 342/357.62
See application file for complete search history.

(56) References Cited

U.S. PATENT DOCUMENTS

| | | | | |
|---|---|---|---|---|
| 4,894,662 A * | 1/1990 | Counselman | .......... | G01C 15/00 342/357.25 |
| 8,040,276 B2 * | 10/2011 | Vadlamani | .............. | G01S 19/23 342/357.62 |
| 8,155,594 B2 * | 4/2012 | Brisebois | ............ | H04W 72/085 455/62 |
| 9,176,231 B2 * | 11/2015 | Whelan | ................... | G01S 19/34 |
| 9,482,760 B2 * | 11/2016 | Lennen | .................. | G01S 19/33 |
| 2006/0263755 A1 * | 11/2006 | Mori | ....................... | G01S 19/23 434/239 |
| 2007/0063893 A1 * | 3/2007 | Horton | .................... | G01S 19/11 342/357.55 |
| 2008/0068261 A1 * | 3/2008 | Hempel | ................ | G01S 5/0018 342/357.62 |
| 2008/0166011 A1 * | 7/2008 | Sever | ..................... | G01S 19/28 382/100 |

(Continued)

OTHER PUBLICATIONS

P. Collins: "Memorandum: GPS SNR Observations", Geodetic Research Laboratory, Jun. 12, 2000.*

(Continued)

*Primary Examiner* — Vladimir Magloire
*Assistant Examiner* — Helena H Seraydaryan
(74) *Attorney, Agent, or Firm* — Ditthavong & Steiner, P.C.

(57) ABSTRACT

A measuring system comprises a model generation unit and a signal generator. The model generation unit is adapted to generate a signal model based upon received global navigation satellite system reception data. The signal generator is adapted to generate a measuring signal based upon the signal model and to supply a device under test with the measuring signal.

11 Claims, 6 Drawing Sheets

(56) References Cited

U.S. PATENT DOCUMENTS

| | | | | |
|---|---|---|---|---|
| 2010/0073228 A1* | 3/2010 | Smith | ................ | G01S 19/235 |
| | | | | 342/357.27 |
| 2010/0302100 A1* | 12/2010 | Yang | .................. | G01S 19/36 |
| | | | | 342/357.73 |
| 2011/0103432 A1* | 5/2011 | Tangudu | ............ | G01S 19/21 |
| | | | | 375/150 |
| 2011/0109506 A1* | 5/2011 | Humphreys | ........ | G01S 19/215 |
| | | | | 342/357.68 |
| 2011/0187598 A1* | 8/2011 | Dai | .................. | G01S 19/44 |
| | | | | 342/451 |
| 2011/0215967 A1* | 9/2011 | Suzuki | ................ | G01S 19/29 |
| | | | | 342/357.31 |
| 2013/0271317 A1* | 10/2013 | Goel | .................. | G01S 19/23 |
| | | | | 342/357.62 |

OTHER PUBLICATIONS

Spirent Communications PLC, DAN004 Issue 1-02, "Application Note: Simulating Multipath", 2011 retrieved on Jul. 24, 2015 from http://www.spirent.com/~/media/Application%20notes/Positioning/DAN004_Simulating_multi-path_AppNote.pdf, 28 Pages.

Boulton et al., "Proposed Models and Methodologies for Verification Testing of AGPS-Equipped Cellular Mobile Phones in the Laboratory", The International Technical Meeting of the Satellite Division of the Institute of Navigation 2002, retrieved on Jul. 24, 2015 from http://citeseerx.ist.psu.edu/viewdoc/download?doi=10.1.1.488.3069&rep=rep1&type=pdf, 13 Pages.

* cited by examiner

MEASURING SYSTEM AND MEASURING METHOD FOR MODEL BASED GENERATION OF GLOBAL NAVIGATION SATELLITE SYSTEM SIGNALS

RELATED APPLICATION

This application claims the benefit of the earlier filing date under 35 U.S.C. § 119(e) of U.S. Provisional Application Ser. No. 61/983,796 filed Apr. 24, 2014, entitled "Measuring System and Measuring Method for Model Based Generation of Global Navigation Satellite System Signals," the entirety of which is incorporated herein by reference.

TECHNICAL FIELD

The invention relates to a measuring system and measuring method for supplying a global navigation satellite system signal to a receiver for global navigation satellite system signals and the generation of this signal.

BACKGROUND ART

During the last years, the use of global navigation satellite systems has been become wide spread. Receivers for global navigation satellite system signals are present in dedicated navigation systems and cell phones. In numerous countries, automatic emergency beacons determining a location of the respective automobile and transmitting it, will be required to be installed in all automobiles, manufactured. Measuring systems and measuring methods for measuring the properties of such global navigation satellite system receivers are therefore necessary.

The document DAN004 ISSUE 1-02, "Simulating Multipath—Application Note", Spirent, shows the creation of measuring signals for testing global navigation satellite system receivers. According to this document, the measuring signals are generated synthetical without the use of any real world-data. This approach is disadvantageous, since the so-created measuring signals do not allow for a test of the receivers in a realistic manner.

The document "Proposed Models and Methodologies for Verification Testing of AGPS-Equipped Cellular Mobile Phones in the Laboratory", Peter Boulton, Arnie Read, Spirent Communications, Proceedings of the 15$^{th}$ International Technical Meeting of the Satellite Division on The Institute of Navigation (ION GPS 2002) also shows the creation of measuring signals for testing global navigation satellite system receivers. According to this document, different categories of reception conditions are defined. Typical signal distributions for these different categories are set. By means of verification measurements, these set parameters are verified against a real-world-scenario. Also this approach is disadvantageous, since the so-generated measuring signals still do not allow for a testing of the receivers under realistic conditions.

Accordingly, an object of the invention is to create a measuring system and measuring method for generating measuring signals for testing receivers for global navigation satellite systems under realistic conditions.

SUMMARY OF THE INVENTION

A measuring system according to a first aspect of the present invention comprises a model generation unit and a signal generator. The model generation unit is adapted to generate a signal model based upon global navigation satellite system reception data. The signal generator is adapted to generate a measuring signal based upon the signal model and to supply a device under test with the measuring signal. It is thereby possible to test the device under test—the receiver—under realistic conditions.

According to a first preferred example of an implementation form, the measuring system comprises a data storage unit being adapted to stored global navigation satellite system reception data. It is therefore possible to generate the measuring signal as needed based upon the underlying global navigation satellite system reception data. A great flexibility of measuring signal generation can thereby be achieved.

According to a second preferred example of an implementation form, the global navigation satellite system reception data comprises one or more data sets. The data set comprises signal-to-noise ratios of received global navigation satellite signals for a plurality of satellites for a plurality of directions for one specific location. It is thereby possible to further increase the flexibility of signal generation.

According to a third preferred example of an implementation form of the inventive measuring system, the model generation unit is adapted to determine reception conditions for the plurality of directions based upon a statistical analysis of the signal-to-noise ratios of the data set. A very accurate representation of the reception conditions in the measuring signal is thereby possible.

According to a fourth preferred example of an implementation form, the model generation unit is adapted to determine the reception conditions as "line-of-sight", if only signal-to-noise values above a first threshold are present in the data set for a specific direction. A further determined reception condition is "line-of-sight with echos". This condition is determined, if signal-to-noise values above the first threshold and signal-to-noise values below the first threshold are present in the data set for a specific direction. A further reception condition is "echos only". This condition is determined, if no signal-to-noise values above the first threshold are detected but at the same time signal-to-noise values below the first threshold but above a second threshold are present in the data set for a specific direction. A further reception condition is "blocked". This condition is detected if no signal-to-noise values above the second threshold are present in the data set for a specific direction. A last reception condition is "no data". This condition is detected, if so far no reception values are present for a certain direction of reception. This is the case if either no satellite has passed this direction since the beginning of measurement or if by design, no satellite can pass this direction, since the inelination of the satellite orbits does not position any satellite there. By determining these different categories of reception conditions, it is possible to very accurately recreate the real-world reception conditions in the measuring signal.

According to a fifth preferred example of an implementation form, the measuring system comprises a reception unit, which is adapted to receive the global navigation satellite system reception data and a camera, which is adapted to capture at least an image of the surroundings of the measuring system for at least a location of the measuring system. The model generation unit is then adapted to generate the signal model based upon the global navigation satellite system reception data and the at least one image by using the data from the image. A further increase in accuracy of the model generation and therefore also of the measuring signal generation is achieved.

According to a sixth preferred example of an implementation form, the model generation unit is adapted to generate the signal model based upon the global navigation satellite system reception data and the at least one image by determining from the at least one image, directions at the at least one location, in which a direct view of the sky is possible, and by determining the first threshold and the second threshold from the signal-to-noise ratios of the data set for these directions. A very accurate model generation and therefore also measuring signal generation is therefore possible.

According to a seventh preferred example of an implementation form of the inventive measuring system, the model generation unit is adapted to interpolate reception conditions for directions, for which only "no data" reception conditions are determined in the statistical analysis of the signal-to-noise ratios using reception conditions of neighbouring directions, for which reception conditions other then "no data" are determined in the statistical analysis of the signal-to-noise ratios. It is thereby possible to fill in blanks between received signals. This is especially necessary in order to limit the time during which the global navigation satellite system reception data is received. Even when a receiver is active for twelve hours, still there remain directions, at which during this measuring interval, no satellite was present.

According to a second aspect of the present invention, a measuring method is provided. The measuring method comprises generating a signal model based upon global navigation satellite system reception data and generating a measuring signal based upon the signal model and supplying a device under test with the measuring signal. It is thereby possible to test the device under test and under very realistic conditions.

BRIEF DESCRIPTION OF THE DRAWINGS

An exemplary embodiment of the invention is now further explained by a way of example only but with respect to the drawings, in which.

DETAILED DESCRIPTION OF THE PREFERRED EMBODIMENTS

Figure 1:
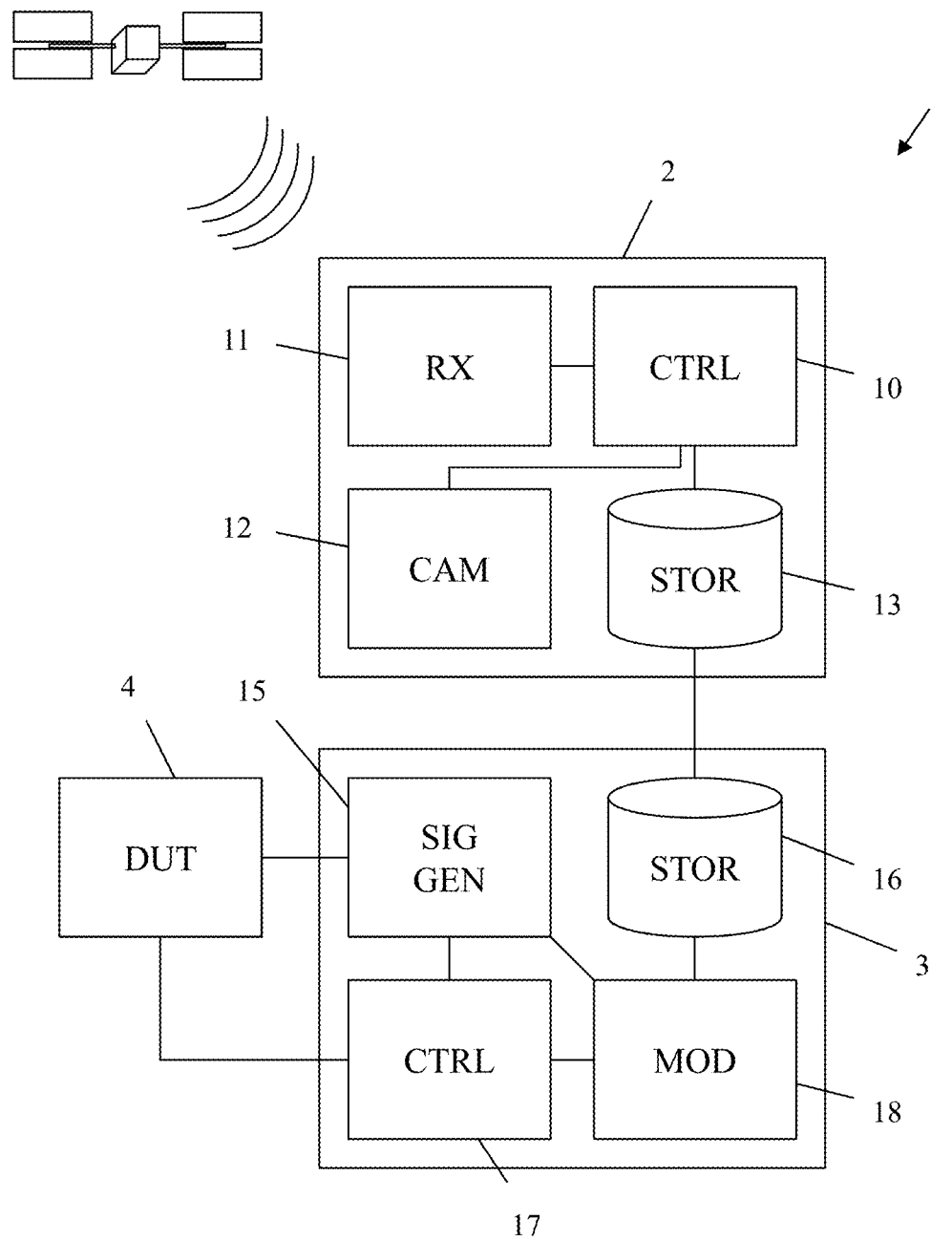
FIG. 1 shows an exemplary embodiment of the inventive measuring system.

First we demonstrate the construction and function of an embodiment of the inventive measuring system along FIG. 1. With regard to FIGS. 2-6, the detailed function of the embodiment of the inventive measuring system is described. Finally, along FIG. 7, the functions of an embodiment of the inventive measuring method are described. Similar entities and reference numbers in different figures have been partially omitted. Reference will now be made in detail to the preferred embodiments of the present invention, examples of which are illustrated in the accompanying drawings. However, the following embodiments of the present invention may be variously modified and the range of the present invention is not limited by the following embodiments.

First Embodiment

In FIG. 1, a first embodiment of the inventive measuring system 1 is depicted. The measuring system 1 comprises a control unit 10, connected to a reception unit 11, a camera 12 and a storage unit 13. The control unit 10, the reception unit 11, the camera 12 and the storage unit 13 are located in a first measuring device 2, for example a measuring receiver for global navigation satellite system signals. The storage unit 13 is connected to a storage unit 16, which again is connected to a modeling unit 18, which in turn is connected to a signal generation unit 15 and a second control unit 17. The storage unit 16, the signal generation unit 15, the control unit 17 and the modeling unit 18 are located in a second measuring device 3, for example a measuring signal generator. The signal generator 15 and the control unit 17 are connected to a device under test 4.

It is important to note that the separation of components into the first measuring device 2 and the second measuring device 3 is not relevant for the present invention. The components can be located in the two measuring devices 2, 3 in any combination. Also an allocation of all components into a single measuring device is possible. Especially, if the components are allocated to a single measuring device, the storage unit 13 and 16 can be omitted. In this case, the control unit 10 is directly connected to the modeling unit 18 also, in this case the second control unit 17 and the first control unit 10 can be combined into a single control unit. In this case, the single control unit is connected to the reception unit 11, the camera 12, the modeling unit 18, the signal generator 15 and the device under test 4.

The reception unit 11 is adapted to receive global navigations satellite system signals from global navigation satellites. These can be GPS satellites, Glonass satellites, Galileo satellites, etc. The reception unit 11 is preferably able to receive signals unidirectionally. The received signals are handed on to the control unit 10, which processes the signals. Especially, the control unit 10 is adapted to determine from the received signals, which satellite they originate from. From this information, the control unit 10 calculates the present position of the respective satellite in order to determine, which direction the individual signal was received from. For each received signal, a data point is created. The data point comprises a signal-to-noise ratio of the received signal, and the direction, the signal was received from. Optionally, the data point additionally can include the received signal, the satellite, the signal was received from, the frequency, the signal was received on, etc. From these data points, data sets are created. Each data set comprises signal-to-noise ratios of received global navigation satellite signals for a plurality of satellites for a plurality of directions for one specific location of the measuring system 1. The resulting data sets are stored in the storage unit 13.

Optionally, the measuring system 1 captures at least one image of the surroundings of the location that is presently examined by use of the camera 12. The image recorded by the camera 12 is handed on to the control unit 10, which determines from the image taken by the camera directions, at which the sky is visible. These directions are optionally additionally stored with the respective data sets in the storage unit 13. Alternatively the images can be stored with the data sets for later analysis.

In the here-depicted case of the measuring system 1 comprising two separate measuring devices 2 and 3, the data sets stored in the storage unit 13 are transferred to the storage unit 16 within the measuring device 3. The modeling unit 18 accesses the stored data sets in the storage unit 16 and performs a signal modeling based upon the global navigation satellite system reception data of the data sets. Also the information derived from the image taken by the camera 12 is used to create the model. In order to perform this modeling, a statistical analysis of the global navigation satellite system reception data is performed. The signal-to-noise ratios for each direction are analyzed. The information derived from the camera image is also used during the statistical analysis of the signal-to-noise ratios. The analysis is explained in more detail in FIG. 2. Based upon this analysis, reception conditions of different categories are defined. Also this is explained in greater detail along FIG. 2-FIG. 6. These determined reception conditions form the model for creating the measuring signal. The signal generator 15 accesses this signal model generated by the modeling unit 18 and creates the measuring signal based there upon. Especially, during creation of the signal, the reception conditions present in the model are used. The resulting measuring signal is handed on to the device under test 4. A result of the measurement is transferred to the control unit 17 by the device under test.

Additionally, the measuring system 1, and especially the control unit 10 can furthermore determine a movement speed of the measuring system, in case the measuring system is in motion during measuring the global navigation satellite system signals. This movement speed is then additionally stored for each data point and data set in the storage unit 13. The model is then generated by the modeling unit 18 also taking the movement speed into account. The measuring signal can then be generated by the signal generator 15 also taking a simulated movement speed of the device under test 4 into account.

Figure 2:
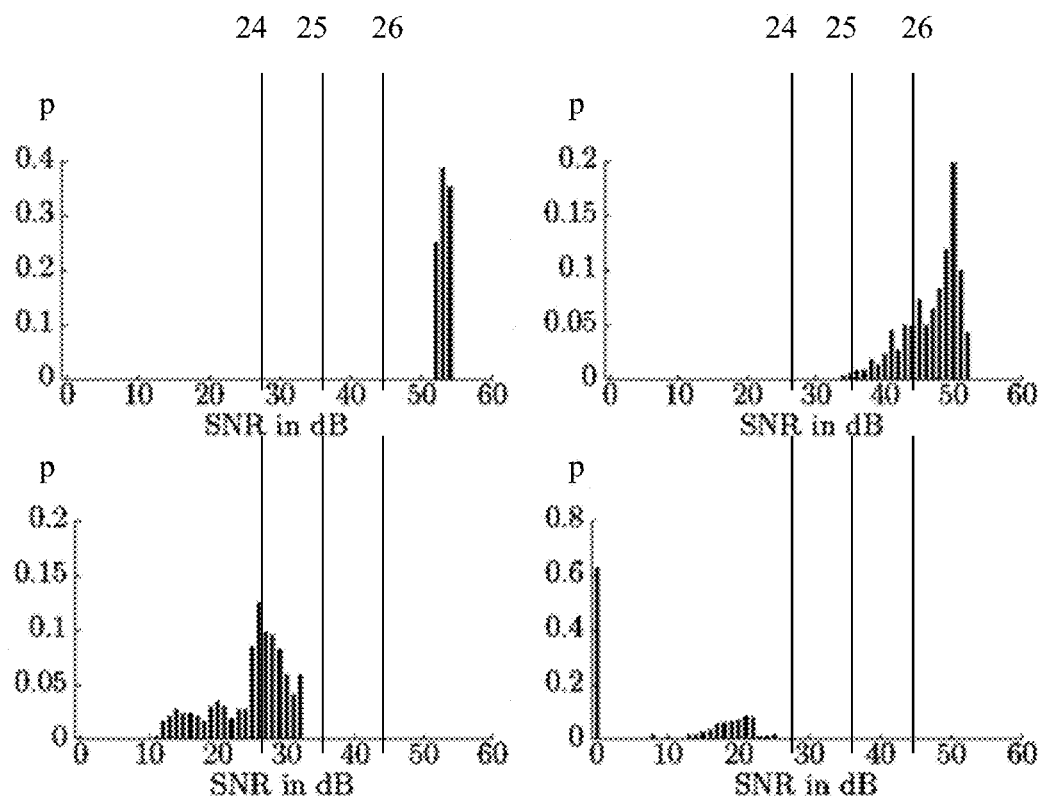
FIG. 2 shows global navigation satellite system reception data in different reception scenarios.

Along FIG. 2, the statistical analysis of the signal-to-noise ratios is explained in greater detail. In the upper left image of FIG. 2, a "line-of-sight" reception condition is displayed. Only signal-to-noise ratios above a first threshold 26 are present. In the upper right image, a "line-of-sight with echos" reception condition is depicted. Such a reception condition is detected, if signal-to-noise ratios above the first threshold 26 and between the first threshold 26 and a second threshold 25 are present. In the bottom left image of FIG. 2, a "echos only" reception condition is depicted. Such a reception condition is detected, if there are no signal-to-noise ratios between the first threshold 26 and the second threshold 25, but if there are signal-to-noise ratios between the second threshold 25 and a third even lower threshold 24. In the bottom right image of FIG. 2, a reception condition "blocked" is depicted. Such a reception condition is detected, if there are no signal-to-noise values between the first threshold and the second threshold and between the second threshold and the third threshold, but if there are signal-to-noise values below the third threshold.

Moreover, a fifth reception condition "no data" is defined for the case that there is no data available for a specific direction. This can be the case, if during the interval, in which the global navigation satellite system signals were measured, no satellite was present in this direction, especially, if due to the orientation of the satellite orbits, no satellite can ever be present in the specific direction. This is especially the case for very high latitudes, since navigation satellites usually are not present in polar orbits.

The first threshold, the second threshold and the third threshold 24, 25, 26 can be predetermined. Alternatively, a user can set these thresholds 24-26. Also preferably, the thresholds 24-26 are determined automatically. Especially, the information from the camera 12 of FIG. 1 can be used for determining the thresholds 24-26. After it has been determined, at which angles a direct view upon the sky is possible, based on the signal-to-noise values of these directions, the thresholds can be set. Especially, in this case, the first threshold is set slightly below the lowest signal-to-noise value in the directions, sky was detected.

Figure 3:
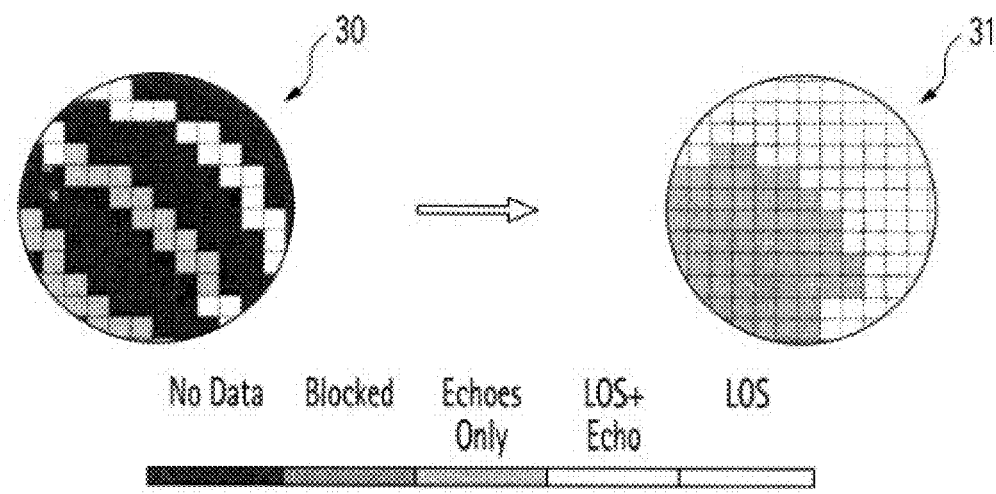
FIG. 3 shows global navigation satellite system reception data in the process of interpolation.

Since the time for performing the measuring of the real-world reception conditions is limited, it is often not possible to perform the measurement until for all possible directions, a satellite signal was received. In this case, the modeling unit 18 is furthermore adapted to perform an interpolation of the determined reception conditions. This is depicted in FIG. 3. On the left side, a 2-dimensional representation of reception conditions 30 before interpolation is shown. On the right side of FIG. 3, a 2-dimensional representation of reception conditions 31 after interpolation is shown. For the interpolation, neighboring directions, for which data is available, is used to interpolate the directions depicted here as black, for which no data is available.

Figure 4:
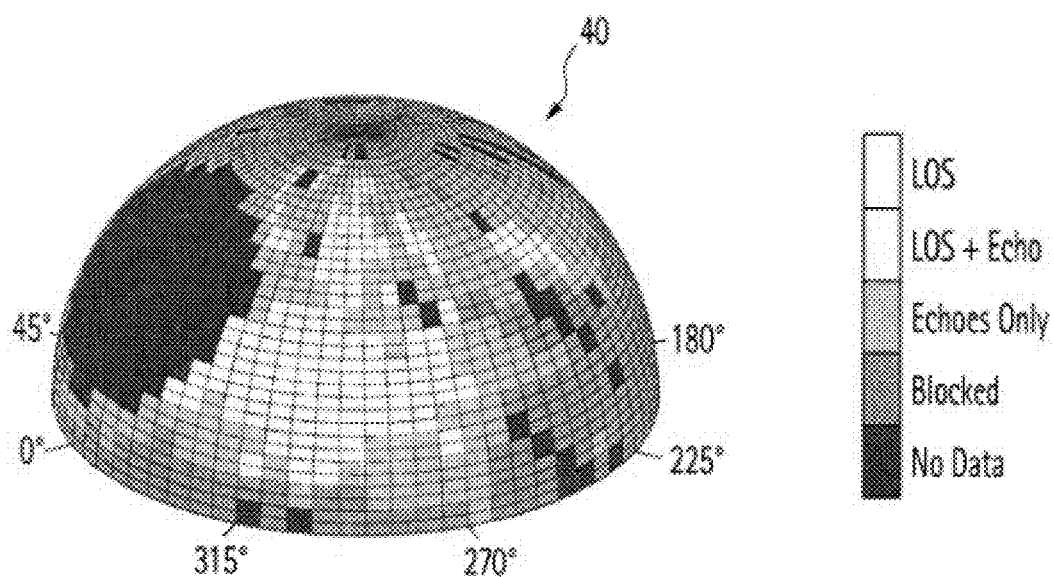
FIG. 4 shows a 3-dimensional representation of global navigation satellite reception data.

In FIG. 4, a 3-dimensional representation of reception conditions 40 for a specific location is shown. The angles depicted around the half-sphere indicate the azimuth, while the elevation is indicated by the curving of the half-sphere. Especially here the area of no data in high northern latitudes can clearly be seen.

Figure 5:
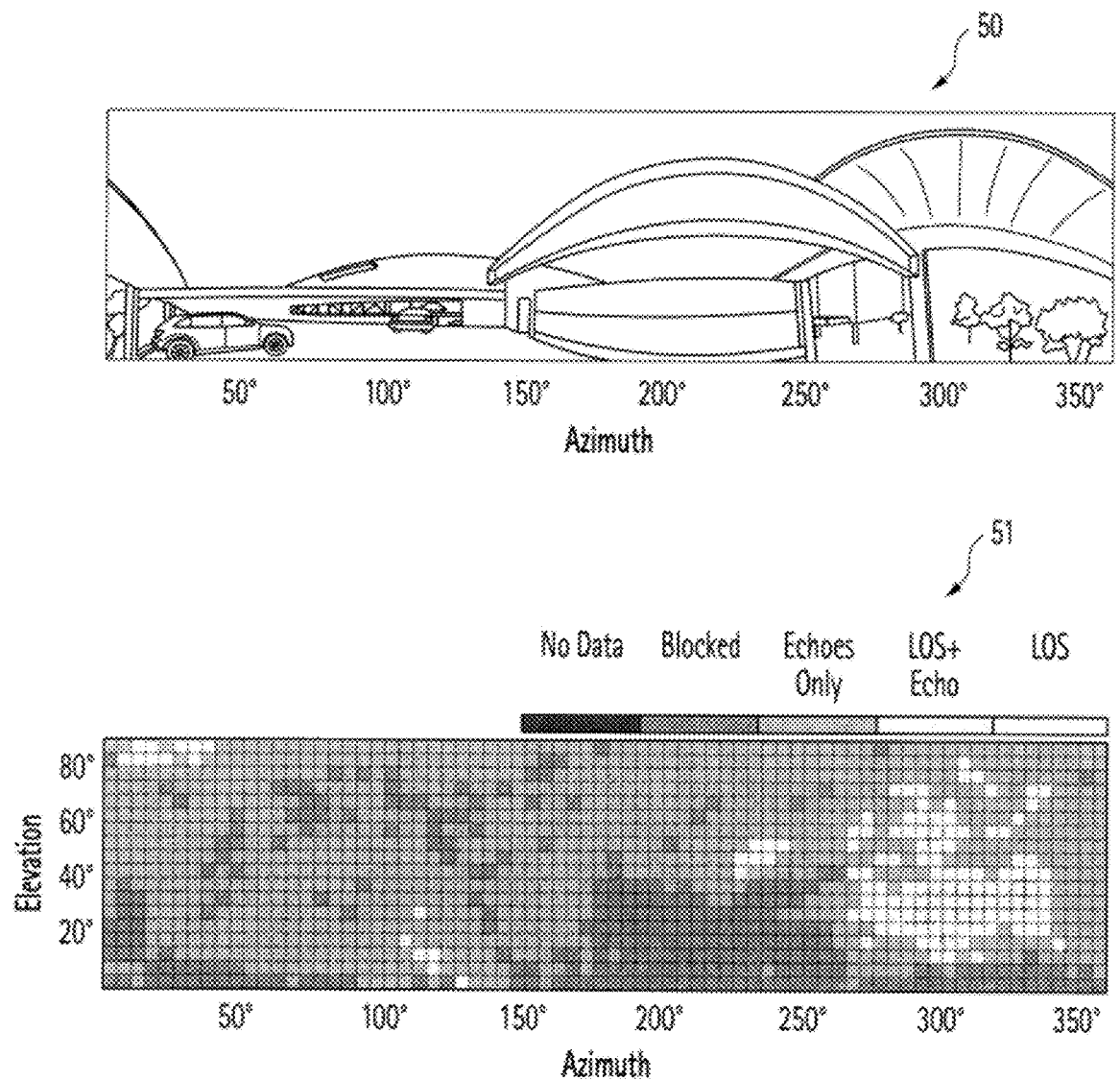
FIG. 5 shows global navigation satellite system reception data in a first real-world scenario.

In FIG. 5, a first real-world scenario is shown in an image 50 and in a 2-dimensional representation of reception conditions 51. It can especially well be seen that the opening on the right side of the parking structure depicted in the image 50 results in "line-of-sight" and "line-of-sight with echos" reception conditions in the respective area of the 2-dimensional representation of reception conditions 51.

Figure 6:
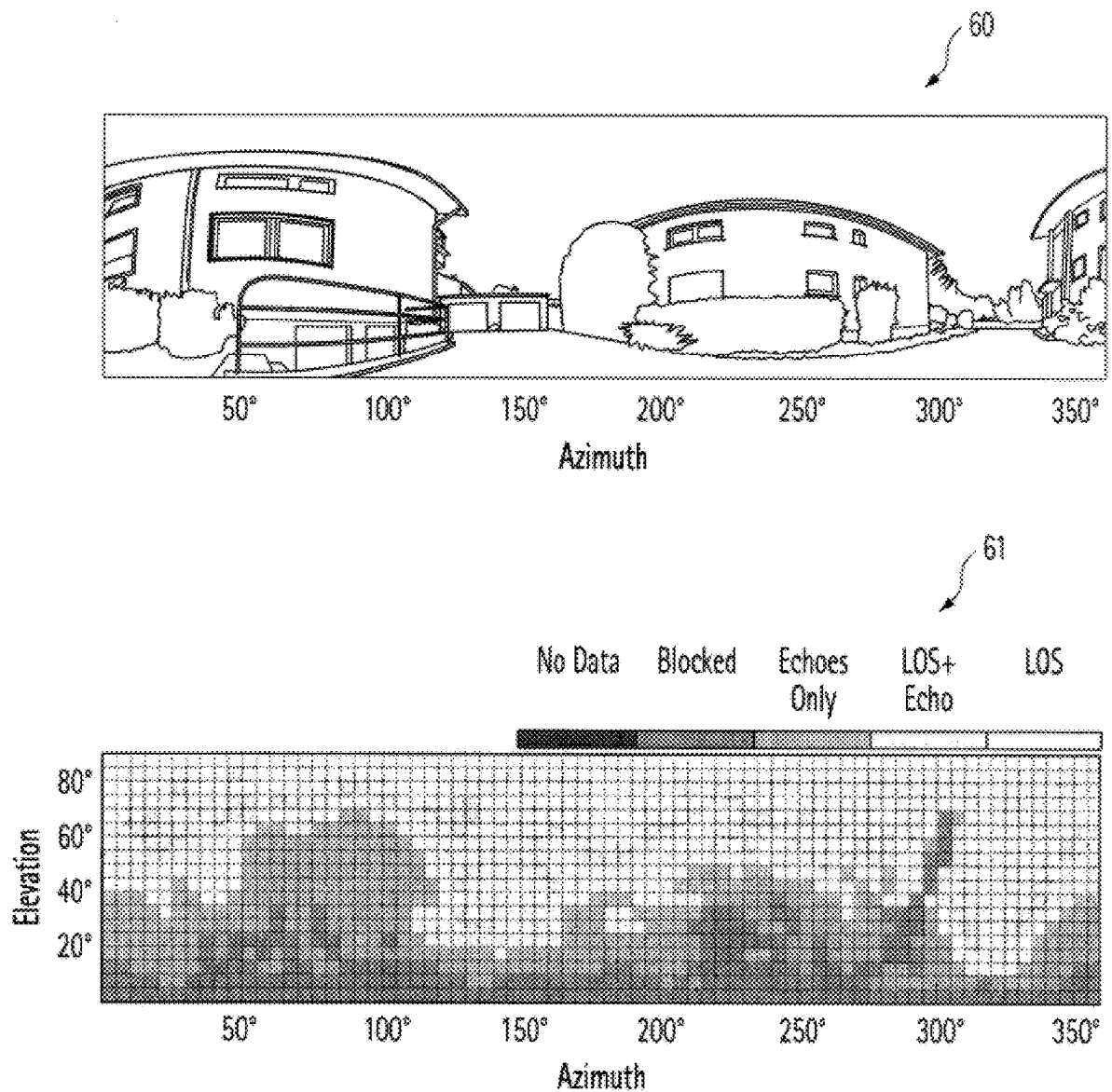
FIG. 6 shows global navigation satellite system reception data in a second real-world scenario.

In FIG. 6, similar images for a second real-world scenario are shown. In an image 60, a suburban location is depicted. Additionally, a 2-dimensional representation of reception conditions 61 is shown. Especially, the silhouettes of the individual houses are represented by varying reception conditions in the 2-dimensional representation of reception conditions 61. Also, the regions of visible sky are clearly evident as line-of-sight reception conditions.

Second Embodiment

Figure 7:
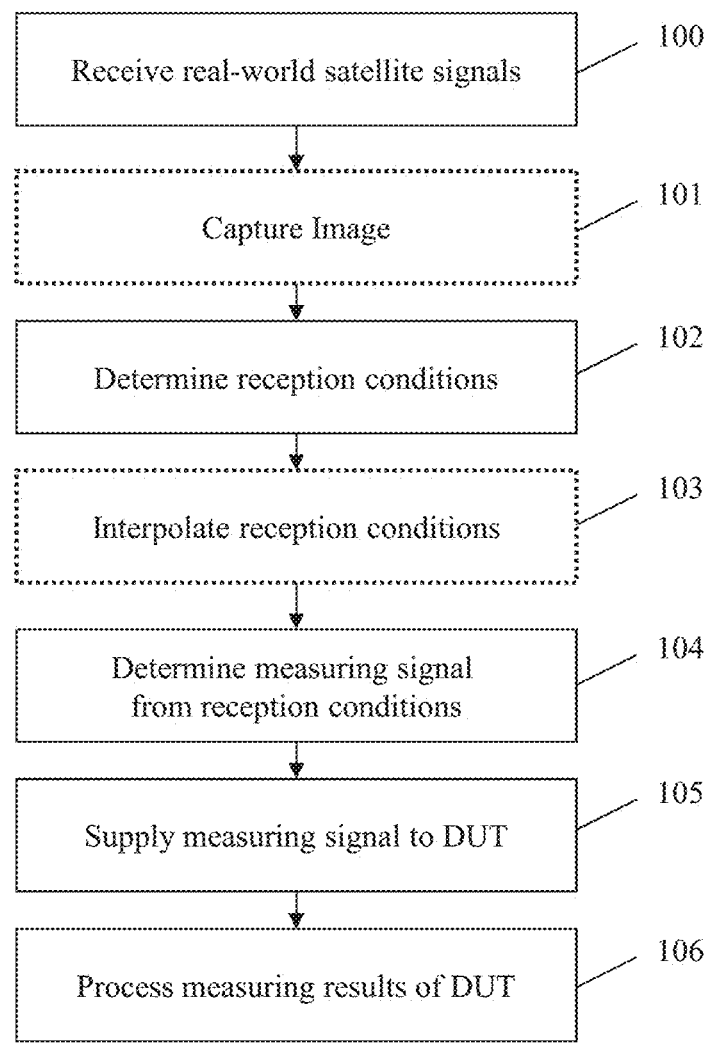
FIG. 7 shows an exemplary embodiment of the inventive measuring method in a flow diagram.

In FIG. 7, an exemplary embodiment of the inventive measuring method is depicted. In a first step 100 real-world global navigation satellite system signals are received. In an optional second step 101, an image of the surroundings of a measuring location is captured. In a third step 102, reception conditions are determined based upon the received satellite signals and optionally based upon the captured image. In an optional fourth step 103, reception conditions are interpolated, in case there are directions, for which no data is available from determining the reception conditions. In a fifth step 104, a measuring signal is determined from the reception conditions. In a sixth step 105, the measuring signal is supplied to a device under test, for example a global navigation satellite system receiver. The measuring results of the device under test are processed in a seventh step 107. Regarding the details of the implementation, it is also referred to the respective sections of the system description.

The embodiments of the present invention can be implemented in hardware, software or any combination thereof. Various embodiments of the present invention may be implemented by one or more application specific integrated circuits (ASICs), digital signal processors (DSPs), digital signal processing devices (DSPDs), program logic devices (PLDs), field programmable gate arrays (FPGAs), processors, controllers, micro controllers, micro processors or the like.

Various embodiments of the present invention may also be implemented in the form of software modules, processes, functions or the like which perform the features or operations described above. Software code can be stored in a memory unit so that it can be executed by a processor. The memory unit may be located inside or outside the processor and can communicate with the processor through a variety of known means.

The invention is not limited to the described global navigation satellite systems. Especially, it can be used with any already available or future satellite navigation systems. The characteristics of the exemplary embodiments can be used in any advantageous combination. Although the present invention and its advantages have been described in detail, it should be understood, that various changes, substitutions and alterations can be made herein without departing from the spirit and scope of the invention as defined by the appended claims.

I claim:

1. A measuring system comprising:
a reception unit, a model generation unit, a control unit and a signal generator,
wherein the reception unit is adapted to receive global navigation satellite system
signals from global navigation satellites,
wherein the control unit is adapted to process the global navigation satellite system signals and to create global navigation satellite system reception data,
wherein the control unit calculates a present position of the respective satellite,
wherein the control unit determines a direction an individual signal was received from,
wherein the model generation unit is adapted to generate a signal model based upon the global navigation satellite system reception data,
wherein the signal generator is adapted to generate a measuring signal based upon the signal model and to supply a device under test with the measuring signal,
wherein the global navigation satellite system reception data comprises one or more data sets, wherein the at least one data set comprises signal-to-noise-ratios and the direction the signal was received from of received global navigation satellite signals for a plurality of satellites for a plurality of directions for one specific location,
wherein the model generation unit is adapted to determine reception conditions for the plurality of directions based upon a statistical analysis of the signal-to-noise-ratios, and
wherein the signal generator is adapted to use the reception conditions during generation of the measuring signal.

2. The measuring system according to claim 1, wherein the measuring system comprises a data storage unit being adapted to store global navigation satellite system reception data, and wherein the model generation unit is adapted to generate the signal model based upon the global navigation satellite system reception data stored by the storage unit.

3. The measuring system according to claim 1, wherein the model generation unit is adapted to determine the reception conditions as "line-of-sight", if only signal-to-noise values above a first threshold are present in the data set for a specific direction, and/or "line-of-sight with echoes", if signal-to-noise values above the first threshold and signal-to-noise values below the first threshold are present in the data set for a specific direction, and/or "echoes only", if no signal-to-noise values above the first threshold and signal-to-noise values below the first threshold but above a second threshold are present in the data set for a specific direction, and/or "blocked", if no signal-to-noise values above the second threshold are present in the data set for a specific direction, and/or "no data", if no signal-to-noise values are present in the data set for a specific direction.

4. The measuring system according to claim 3, wherein the measuring system comprises a camera, which is adapted to capture at least an image of the surroundings of the Measuring system for at least a location of the measuring system, and wherein the model generation unit is adapted to generate the signal model based upon the global navigation satellite system reception data and the at least one image.

5. The measuring system according to claim 4, wherein the model generation unit is adapted to generate the signal model based upon the global navigation satellite system reception data and the at least one image by determining from the at least one image, directions at the at least one location, in which a direct view of the sky is possible, and by determining the first threshold and/or the second threshold from signal-to-noise-ratios of the data set for these directions.

6. The measuring system according to claim 3, wherein the model generation unit is adapted to interpolate reception conditions for directions, for which only "no data" reception conditions are determined in the statistical analysis of the signal-to-noise-ratios, using reception conditions of neighboring directions, for which reception conditions other than "no data" are determined in the statistical analysis of the signal-to-noise-ratios.

7. A measuring method, comprising:
receiving global navigation satellite system signals from global navigation satellites,
processing the global navigation satellite system signals and creating global navigation satellite system reception data,
calculating the present position of the respective satellite,
determining a direction an individual signal was received from,
generating a signal model based upon the global navigation satellite system reception data,
generating a measuring signal based upon the signal model, and
supplying a device under test with the measuring signal,
wherein the global navigation satellite system reception data comprises one or more data sets,
wherein the at least one data set comprises signal-to-noise-ratios and the direction the signal was received from of received global navigation satellite signals for a plurality of satellites for a plurality of directions for one specific location,
wherein reception conditions for the plurality of directions are determined based upon a statistical analysis of the signal-to-noise-ratios, and
wherein the reception conditions are used during generation of the measuring signal.

8. The measuring method according to claim 7, wherein the reception conditions are determined as "line-of-sight", if only signal-to-noise values above a first threshold are present in the data set for a specific direction, and/or "line-of-sight with echoes", if signal-to-noise values above the first threshold and signal-to-noise values below the first threshold are present in the data set for a specific direction, and/or "echoes only", if no signal-to-noise values above the first threshold and signal-to-noise values below the first threshold but above a second threshold are present in the data set for a specific direction, and/or "blocked", if no signal-to-noise values above the second threshold are present in the data set for a specific direction, and/or "no data", if no signal-to-noise values are present in the data set for a specific direction.

9. The measuring method according to claim 8, wherein the global navigation satellite system reception data is received from at least one global navigation satellite system, and wherein at least an image of the surroundings for at least a location of reception is captured, and wherein the signal model is generated based upon the global navigation satellite system reception data and the at least one image.

10. The measuring method according to claim 9, wherein the signal model is generated based upon the global navigation satellite system reception data and the at least one image by determining from the at least one image, directions at the at least one location, in which a direct view of the sky is possible, and by determining the first threshold and/or the second threshold from signal-to-noise-ratios of the data set for these directions.

11. The measuring method according to claim 8, wherein reception conditions are interpolated for directions, for which only "no data" reception conditions are determined in the statistical analysis of the signal-to-noise-ratios, using reception conditions of neighboring directions, for which reception conditions other than "no data" are determined in the statistical analysis of the signal-to-noise-ratios.

* * * * *